US000001092H

United States Statutory Invention Registration [19]

[11] Reg. Number: H1092

Kobayashi et al.

[43] Published: Aug. 4, 1992

[54] SILVER HALIDE PHOTOGRAPHIC LIGHT-SENSITIVE MATERIAL

[76] Inventors: Akira Kobayashi; Hiroyuki Ushiroyama; Tadashi Sekiguchi; Kazuo Wakuta; Kazuhiro Yoshida, all of Konica Corporation, 1 Sakura-machi, Hino-shi, Tokyo, Japan

[21] Appl. No.: 531,892

[22] Filed: Jun. 1, 1990

[30] Foreign Application Priority Data

Jun. 8, 1989 [JP] Japan ..... 1-147921
Jul. 21, 1989 [JP] Japan ..... 1-189664

[51] Int. Cl.[5] ..... G03C 1/005
[52] U.S. Cl. ..... 430/581; 430/581; 430/584; 430/611; 430/615; 430/627; 430/933
[58] Field of Search ..... 430/584, 611, 615, 627, 430/933

[56] References Cited

U.S. PATENT DOCUMENTS

| | | | |
|---|---|---|---|
| 2,710,801 | 6/1955 | Minsk et al. | 430/551 |
| 4,592,991 | 6/1986 | Yoshida et al. | 430/139 |
| 4,891,309 | 1/1990 | Uesawa et al. | 430/627 |
| 4,939,080 | 7/1990 | Hioki et al. | 430/576 |
| 4,983,506 | 1/1991 | Ono et al. | 430/531 |
| 5,015,563 | 5/1991 | Ohya et al. | 430/546 |

FOREIGN PATENT DOCUMENTS

| | | | |
|---|---|---|---|
| 59-015241 | 1/1984 | Japan | 430/523 |
| 62-089951 | 4/1987 | Japan | 430/615 |
| 63-246739 | 10/1988 | Japan | 430/615 |

*Primary Examiner*—Robert L. Stoll
*Assistant Examiner*—Joseph D. Anthony

[57] ABSTRACT

A silver halide photographic light-sensitive material is disclosed. The silver halide emulsion layer of the light-sensitive material is sensitized in infrared region of the spectrum by a cationic di- or tri-carbocyanine sensitizing dye and a compound represented by formula I, II, or III;

(I)

(II)

(III)

The light-sensitive material is improved in stability of the coating solution of the silver halide emulsion for standing during in its production process and also improved in stability for prolonged storage after production.

1 Claim, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE PHOTOGRAPHIC LIGHT-SENSITIVE MATERIAL

FIELD OF THE INVENTION

The present invention relates to a silver halide photographic light-sensitive material spectrally sensitized to the infrared region. More particularly, it relates to a silver halide photographic light-sensitive material obtained using an emulsion layer coating solution inhibited in the deterioration of performance during its standing, and also promising a good storage stability of the light-sensitive material thus obtained.

BACKGROUND OF THE INVENTION

Use of an infrared light-emitting source as a light source for exposure enables use of a bright safelight, and is advantageous from the view point of readiness in handling. For this reason, proposals have been made on silver halide photographic papers spectrally sensitized to the infrared region.

Such photographic papers can be exposed to light to form an image by utilizing an image forming process of, for example, the so-called scanner system.

In the image forming process according to the scanner system, an original is scanned, an image signal resulting therefrom is converted to light, to which a silver halide photographic light-sensitive material is exposed, and thus a negative image or positive image corresponding to the image on the original is formed. There are various types of recording apparatus in which the image forming process according to the scanner system is practically employed. As light sources for the recording in such scanning recording apparatus, a glow lamp, a xenon lamp, a mercury lamp, a tungsten lamp, a light-emitting diode and so forth have been hither to used. All of these light sources, however, involve practical problems that they give a weak output and have a short lifetime. As a means for solving such problems, there are scanners in which a coherent laser light source such as a helium-neon laser, an argon laser or a helium-cadmium laser is used as a light source in the scanner system. These can give a high output, but have the problems that the apparatus must be large, they are expensive, they require a modulator, and also they have inferior handling characteristics because the safelight for a light-sensitive material must be limited on account of use of visible light.

In contrast, semiconductor lasers are small in size, inexpensive, and yet can be readily modulated, having a longer lifetime than the above lasers. Moreover, since they emit light in the infrared region, the photographic papers spectrally sensitized to the infrared region is suitably used. Such photographic paper can be handled under a bright safelight and has the advantage of more readiness in handling.

On the other hand, it is a well known technique to use a fluorescent brightening agent in order to increase the whiteness of silver halide photographic papers that have been processed.

It is more advantageous to use an oil-soluble fluorescent brightening agent as the fluorescent brightening agent than to use a water-soluble fluorescent brightening agent, in view of the fact that the former fluorescent brightening agent may be flowed out with difficulty in the course of processing.

Incidentally, a silver halide emulsion spectrally sensitized to the infrared region may undergo a serious decrease in sensitivity when an emulsion layer coating solution is prepared and thereafter left to stand. Thus a stable emulsion is advantageous from the viewpoint of the manufacture of light-sensitive materials.

Light-sensitive materials obtained using such an emulsion also have poor storage stability after manufacture, thus having the disadvantage that they are greatly susceptible to desensitization during storage.

Studies made by the present inventors have revealed that such a negative phenomenon is further double strengthened when the fluorescent brightening agent is used for the purpose of increasing the whiteness of photographic papers.

SUMMARY OF THE INVENTION

Accordingly, a first object of the present invention is to provide an infrared-sensitive silver halide photographic material obtained using an emulsion layer coating solution free from the decrease in sensitivity during its standing, and also having good storage stability after the manufacture.

A second object of the present invention is to provide an infrared-sensitive silver halide photographic paper that may cause no deterioration of sensitivity even with use of an oil-soluble fluorescent brightening agent, and also having superior storage stability.

The above objects can be achieved by the following:

A silver halide photographic light-sensitive material comprising a support and a silver halide photographic emulsion layer provided on the support. The silver halide photographic emulsion layer has been spectrally sensitized with at least one selected from a cationic dicarbocyanine dye and a cationic tricarbocyanine dye, and at least one of the silver halide photographic emulsion layer and other hydrophilic colloid layer contains at least one of the compounds represented by the following Formulas I, II and III.

Formula I

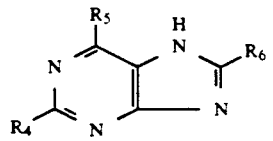

wherein $R_4$, $R_5$ and $R_6$ each represent a hydrogen atom, an alkyl group, alkenyl group, alkoxy group or alkoxycarbonyl group having 1 to 12 carbon atoms, an amino group, an aryl group, a hydroxyl group, a mercapto group, a carboxyl group, or a salt thereof; and all the alkyl group, alkenyl group, alkoxy group, alkoxycarbonyl group, amino group and aryl group may each have a substituent.

Formula II

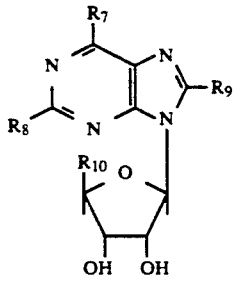

wherein $R_7$, $R_8$ and $R_9$ each represent a hydrogen atom, a halogen atom, a hydroxyl group, or an amino group which may have a substitutent; $R_{10}$ represents a phosphoric acid group, or an alkyl group having 1 to 8 carbon atoms which may be substituted with a hydroxyl group, as exemplified by a methyl, ethyl or hydroxyethyl group.

Formula III

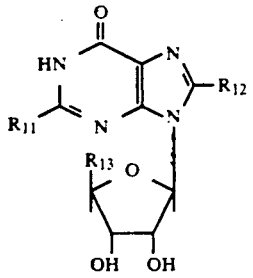

wherein $R_{11}$ and $R_{12}$ each represent a hydrogen atom, a hydroxy group, a methyl group, or an amino group which may have a substituent; $R_{13}$ represents a phosphoric acid group or an alkyl group having 1 to 8 carbon atoms which may be substituted with a hydroxyl group, as exemplified by a methyl, ethyl or hydroxyethyl group.

DETAILED DESCRIPTION OF THE INVENTION

The present invention will now be described below in detail.

Typical examples of the compound represented by the above Formula I are the following:

(I-1)

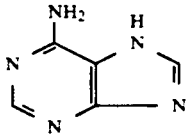

(I-2)

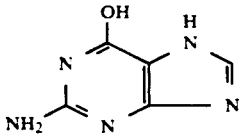

(I-3)

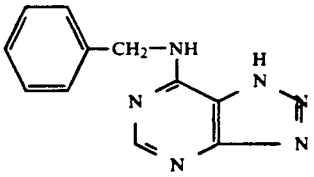

(I-4)

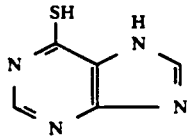

(I-5)

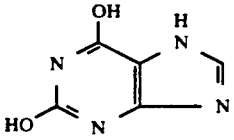

-continued (I-6)

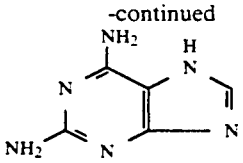

(I-7)

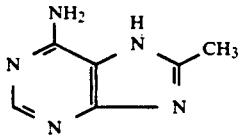

(I-8)

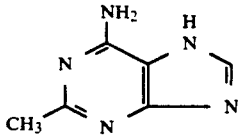

(I-9)

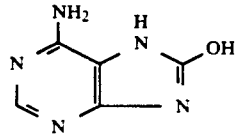

(I-10)

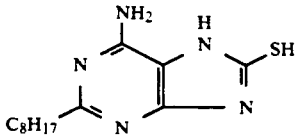

(I-11)

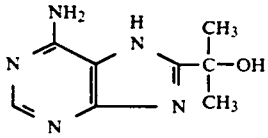

(I-12)

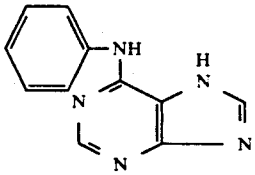

(I-13)

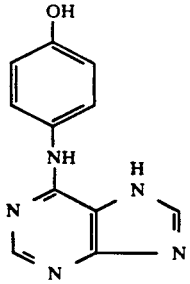

(I-14)

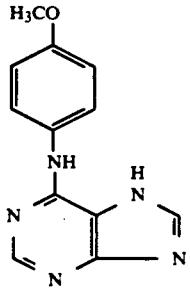

-continued (I-15)

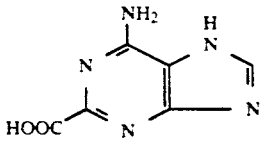

(I-16)

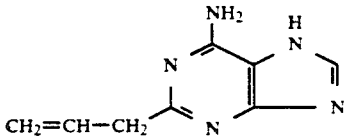

(I-17)

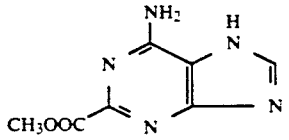

compound. In usual instances, it may preferably be used in an amount ranging from 5 mg to 5 g, and more preferably from 10 mg to 1 g, per mol of silver halide. The compound may be added in a layer other than a silver halide emulsion layer, for example, a layer such as a protective layer, an intermediate layer or an under coat layer, adjacent to the silver halide emulsion layer. In such an instance, the amount of the compound added may be determined according the amount of an emulsion added.

The compounds represented by the above Formula I, II or III are known compounds, and can be synthesized making reference to the methods disclosed in, for example, J.A.C.S. 74, 411 (1952), U.S. Pat. Nos. 2,721,866 and 2,724,711, Merck Index 10.4452, Beil. 31.27, and Beil. 26.449, or they are commercially readily available.

Next, as the cationic di- or tricarbocyanine infrared sensitizing dye used in the present invention may preferably include the compound represented by the following Formula I-a or I-b.

Formula I-a

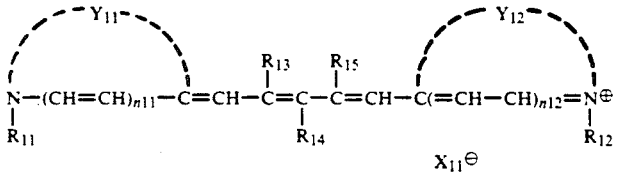

Formula I-b

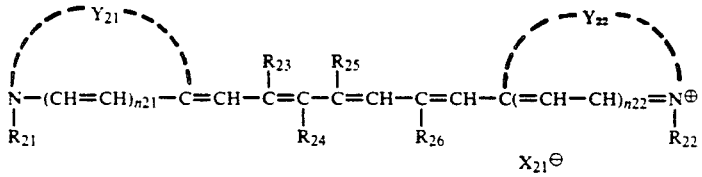

(I-18)

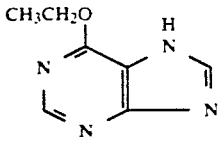

(I-19)

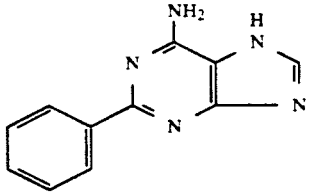

In the formulas, $Y_{11}$, $Y_{12}$, $Y_{21}$ and $Y_{22}$ each represent a group of non-metallic atoms necessary to complete a nitrogen-containing heterocyclic ring of 5 or 6 members, including, for example, a benzothiazole ring, a naphthothiazole ring, a benzoselenazole ring, a naphthoselenazole ring, a benzoxyazole ring, a naphthoxazole, a quinoline ring, a 3,3-dialkylindolenine ring, a benzimidazole ring and a pyridine ring.

The heterocyclic rings may each be substituted with a lower alkyl group, an alkoxy group, a hydroxyl group, an aryl group, an alkoxycarbonyl group or a hydrogen atom.

$R_{11}$, $R_{12}$, $R_{21}$ and $R_{22}$ each represent a substituted or unsubstituted alkyl group, aryl group or aralkyl group.

$R_{13}$, $R_{14}$, $R_{15}$, $R_{23}$, $R_{24}$, $R_{25}$ and $R_{26}$ each represent a hydrogen atom, a substituted or unsubstituted alkyl group, alkoxy group, phenyl group or benzyl group, or

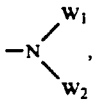

where $W_1$ and $W_2$ each represent a substituted or unsubstituted alkyl group, the alkyl moiety has 1 to 18, and preferably 1 to 4, carbon atoms, or a substituted or unsubstituted aryl group, and $W_1$ and $W_2$ may each combine each other to form a nitrogen-containing heterocyclic ring of 5 or 6 members.

The typical examples of the compound represented by the above Formula II or III are the following:

(II-1) 6-Amino-purine ribocide
(II-2) 6-Chloro-purine ribocide
(II-3) 6-Methylamino-purine ribocide
(II-4) 5'-Phosphoric acid-6-amino-purine ribocide
(II-5) 5'-Phosphoric acid-6-chloro-purine ribocide
(II-6) 5'-Phosphoric acid-6-amino-purine ribocide
(II-7) 5'-Hydroxymethyl-6-methylamino-purine ribocide
(II-8) 5'-Methyl-6-amino-purine ribocide
(III-1) 6-Oxy-purine ribocide
(III-2) 2-Amino-6-oxy-purine ribocide
(III-3) 5'-Phosphoric acid-6-oxy-purine ribocide The amount of the compound represented by the above Formula I, II or III may vary depends on the type of a silver halide emulsion and the kind of the $R_{13}$ and $R_{15}$, and $R_{23}$ and $R_{25}$ may also combine each other to form a 5-membered ring or 6-membered ring. $X_{11}$ and $X_{21}$ each represent an anion. $n_{11}$, $n_{12}$, and $n_{21}$ and $n_{22}$ each represent 0 or 1.

Examples of the sensitizing dye used in the present invention (hereinafter "the sensitizing dye of the present invention") are shown below. The present invention, however, is by no means limited to these. In the following, I-1 to I-13 correspond to the compound represented by Formula I-b and I-14 to I-21, the compound represented by Formula I-a.

I-1

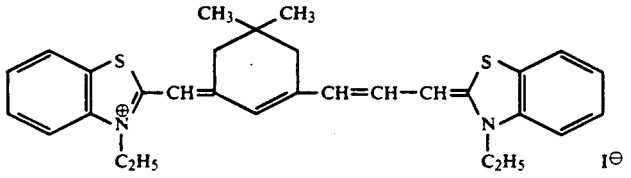

I-2

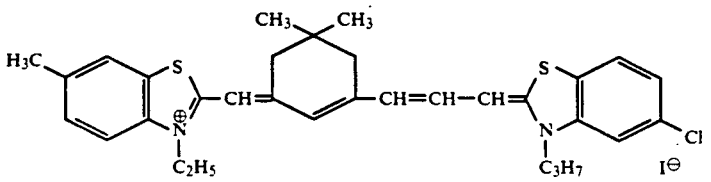

I-3

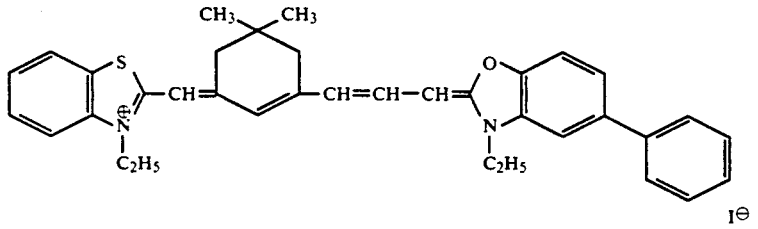

I-4

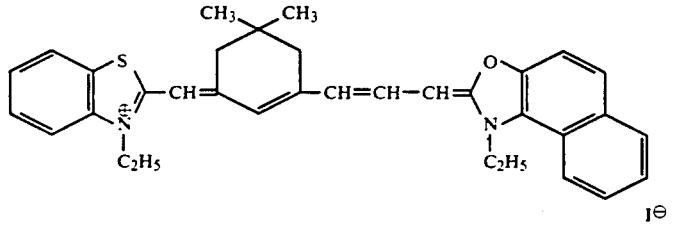

I-5

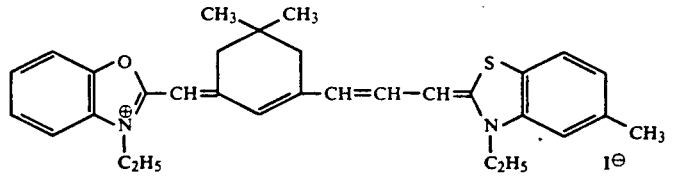

I-6

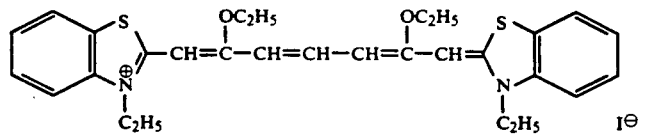

I-7

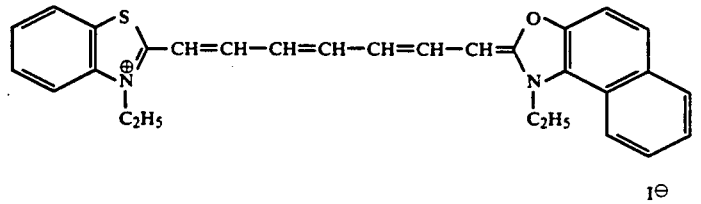

-continued
I-8
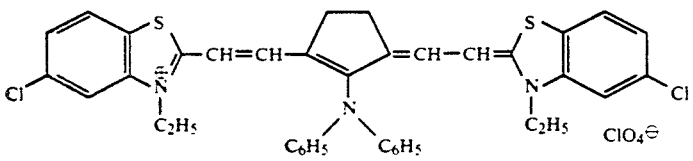
I-9
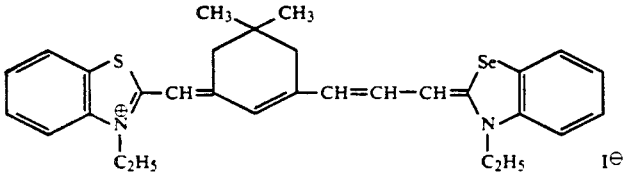
I-10
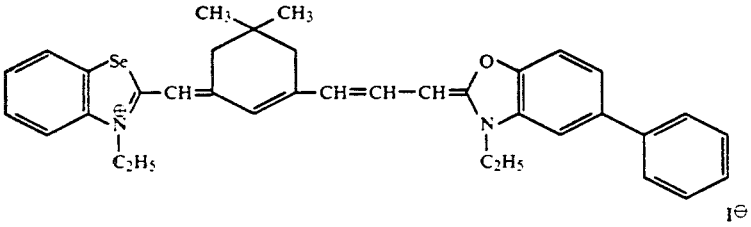
I-11
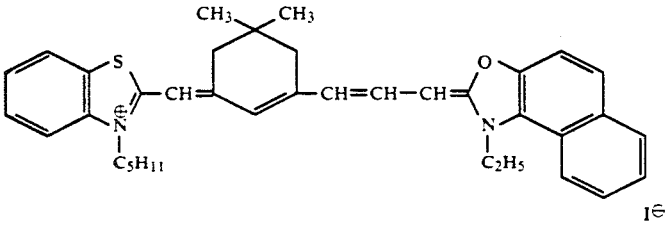
I-12
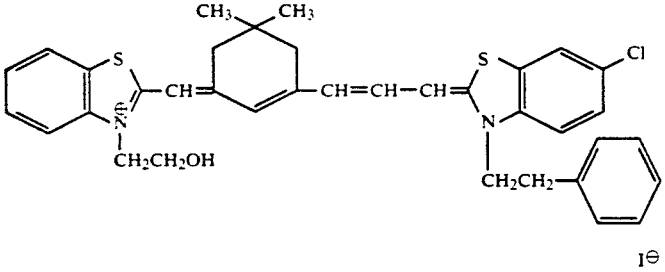
I-13
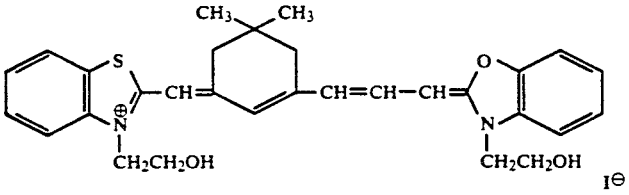
I-14
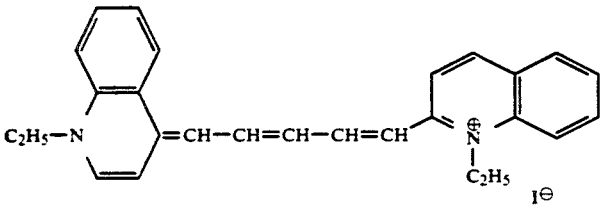

-continued
I-15
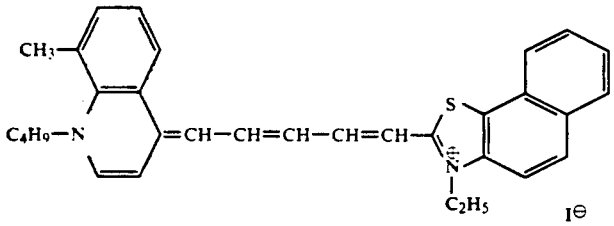
I-16
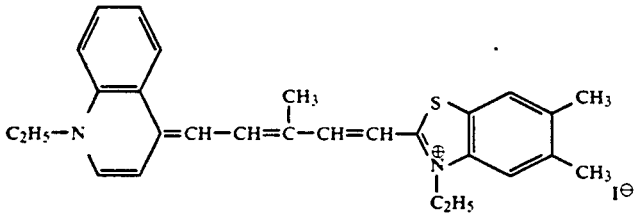
I-17
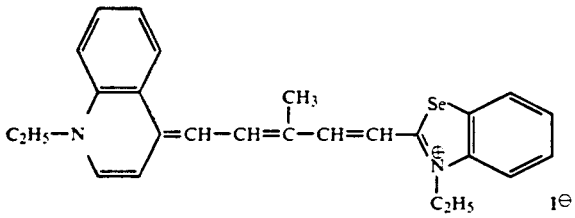
I-18
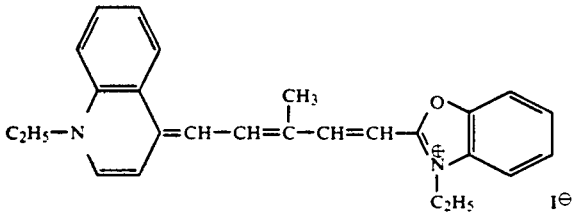
I-19
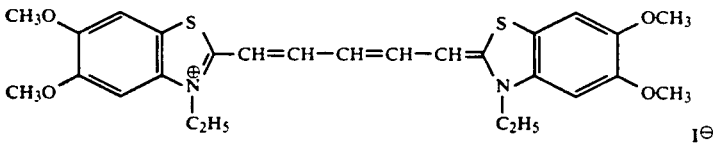
I-20
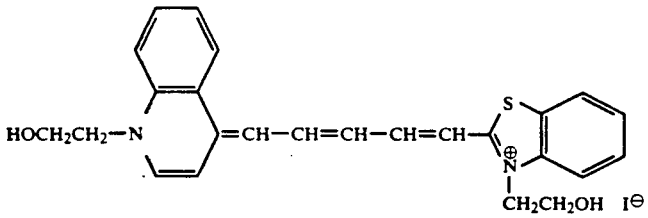
I-21
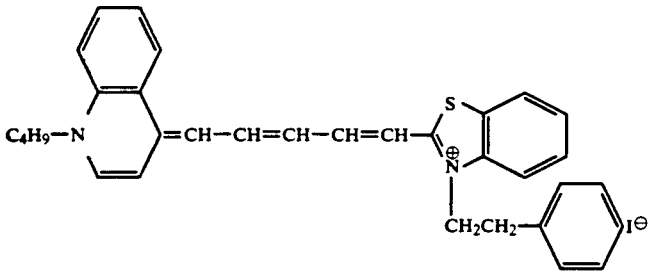
The sensitizing dye of the present invention may be contained in a silver halide photographic emulsion pref- The sensitizing dye of the present invention may be directly dispersed in the emulsion. It may also be first dissolved in a suitable solvent as exemplified by methyl alcohol, ethyl alcohol, methyl cellosolve, acetone, water, pyridine or a mixed solvent of any of these, and then added in the emulsion in the form of a solution.

The sensitizing dye of the present invention may be used alone or in combination of two or more kinds. A sensitizing dye other than that of the present invention may also be used in combination. When sensitizing dyes are used in combination, they may preferably be used so as to be in the above amount in total.

The sensitizing dye of the present invention can be readily synthesized making reference to U.S. Pat. No. 2,503,776, British Patent No. 742,112. French Patent No. 2,065,662 and Japanese Examined Patent Publication No. 2346/1965.

The phenol resin further includes a resol, a resitol and a resite, which are different from each other in the degree of its condensation, prepared by condensation using an alkali.

The phenol resin used in the present invention is a phenol resin obtained by condensation of at least one of phenols with at least one of aldehydes. It may also be a phenol resin obtained by mixture of two or more kinds of phenol resins, or by further condensation of at least two different kinds of phenol resins.

The phenol resins are described in "Phenol Resins", Nikkan Kogyo Shinbun-sha, Course of Plastic Materials, as well as Japanese Patent Publication Open to Public Inspection (hereinafter referred to as Japanese Patent O.P.I. Publication) No. 123035/1979, No. 105254/1980, No. 105380/1980, No. 153948/1980 and No. 161250/1980, and Japanese Examined Patent Publication No. 20543/1981.

Examples of phenol resins effective for the present invention are shown below. In the following, m and n each represent a polymerization molar ratio.

Exemplary Phenol Resins:

V-1

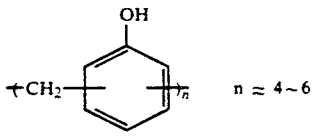

V-2

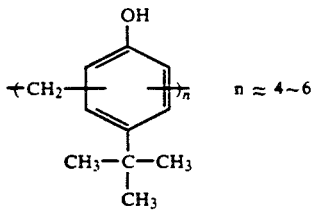

V-3

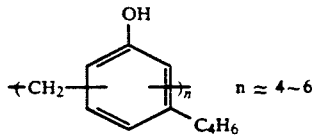

V-4

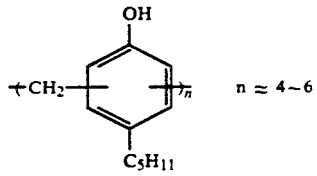

-continued

Exemplary Phenol Resins:

V-5

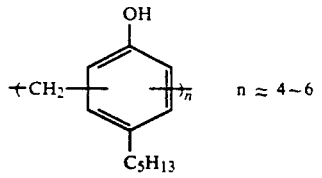

V-6

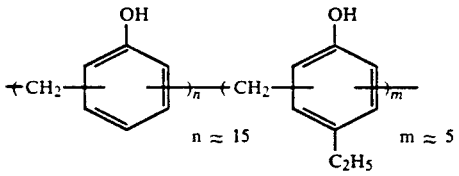

V-7

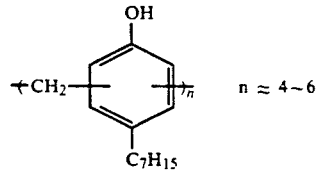

V-8

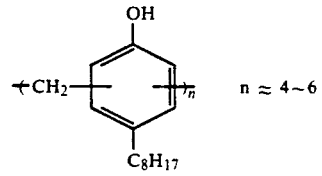

V-9

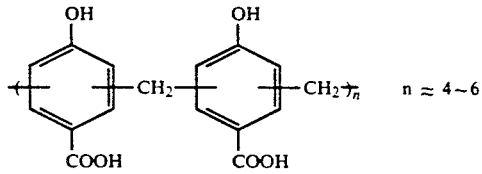

V-10

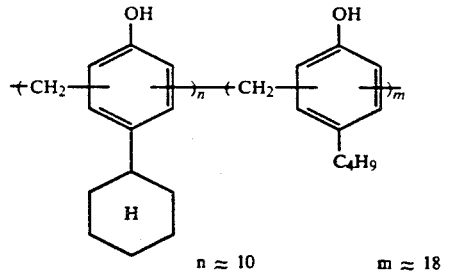

V-11

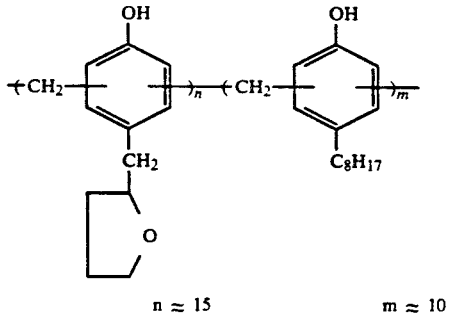

-continued

Exemplary Phenol Resins:

V-12

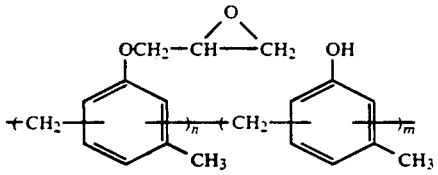

n ≈ 5 m ≈ 15

V-13

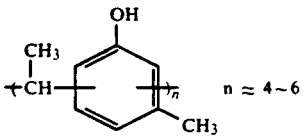

n ≈ 4~6

V-14

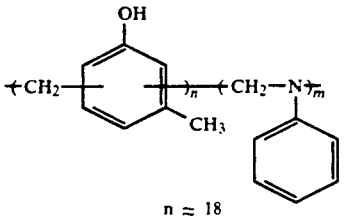

n ≈ 18 m ≈ 2

V-15

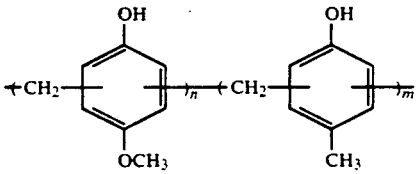

n ≈ 5 m ≈ 20

V-16

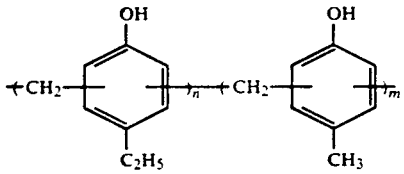

n ≈ 2 m ≈ 3

V-17

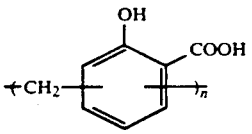

n ≈ 4~6

Degree of polymerization of these phenol resins may range from 2 to 10,000, and preferably from 3 to 1,000.

The above phenol resin may be contained in a sensitizing dye solution preferably in an amount of from $1\times10^{-4}$ g to 100 g, and more preferably from $1\times10^{-3}$ g to 10 g, per mol of silver halide.

The fluorescent brightening agent relating to the present invention will be described below. It is conventionally well known to use a fluorescent brightening agent for the purpose of increasing the whiteness of a silver halide photographic paper that has been processed.

As the fluorescent brightening agent, it is more advantageous to use an oil-soluble fluorescent brightening agent than to use a water-soluble fluorescent brightening agent, in view of the fact that the former fluorescent brightening agent may be flowed out with difficulty in the course of processing.

A technique by which the oil-soluble fluorescent brightening agent is added in a light-sensitive material is known to include a method in which an oil-soluble fluorescent brightening agent is dissolved in an organic solvent, and added in a light-sensitive material as an emulsified dispersion, as disclosed, for example, in British Patent No. 1,072,915, Japanese Examined Patent Publication No 137376/1970 and Japanese Patent O.P.I. Publication No. 134232/1985. In particular, Japanese Patent O.P.I. Publication No. 134232/1985 questions about a decrease in fluorescent brightening effect that may occur when an oil-soluble fluorescent brightening agent and a developing agent are present together in a light-sensitive material, and provides a means for solving this problem.

However, as previously discussed, a silver halide photographic infrared-sensitive material in which the oil-soluble fluorescent brightening agent is used has the negative effect that the sensitivity and storage stability of the light-sensitive material is deteriorated.

As a method in which the oil-soluble fluorescent brightening agent is dissolved in a high-boiling organic solvent to make an emulsified dispersion, advantageously used is the same method as used for dispersing an oil-soluble coupler or an oil-soluble ultraviolet absorbent, i.e., a method in which the agent is dissolved in a high-boiling organic solvent optionally together with a low-boiling organic solvent, and the resulting dispersion is mixed with an aqueous gelatin solution containing a surface active agent, followed by emulsifying dispersion using an emulsifying machine such as a colloid mill, a homogenizer or an ultrasonic dispersion machine. Here, the high-boiling organic solvent used includes carboxylic acid esters, phosphoric acid esters, carboxylic amides, and hydrocarbons. For the sake of reference, examples of the high-boiling organic solvent advantageously used in the present invention are shown below.

I-1

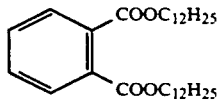

I-2

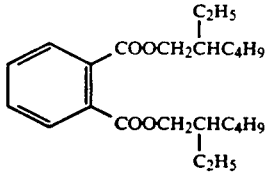

I-3

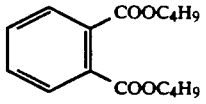

I-4

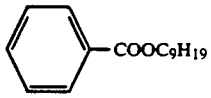

I-5

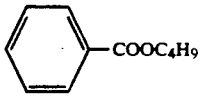

-continued

I-6

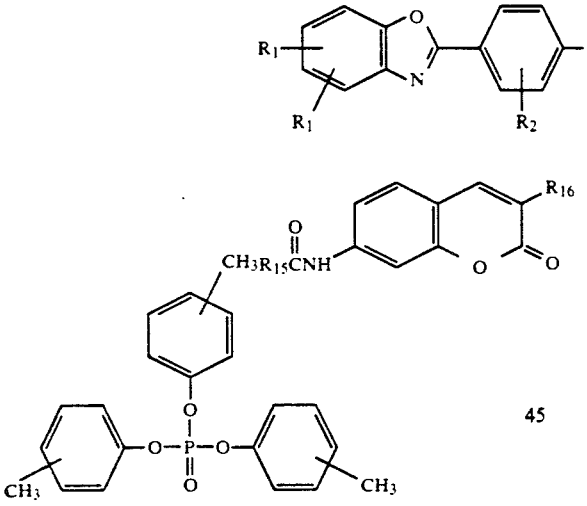

I-7

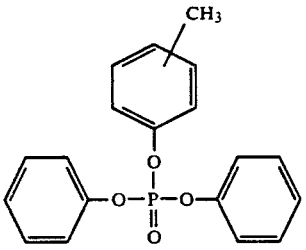

I-8

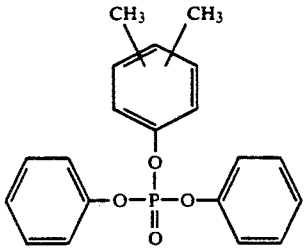

-continued

| | |
|---|---|
| Paraffin | I-9 |
| Paraffin chloride | I-10 |

Oil-soluble fluorescent brightening agents that can be advantageously used include those represented by the following Formulas II-a, II-b, II-c and II-d.

[II-a]

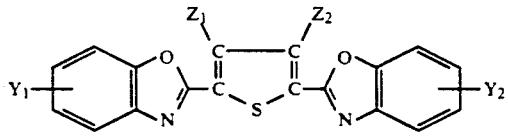

[II-b]

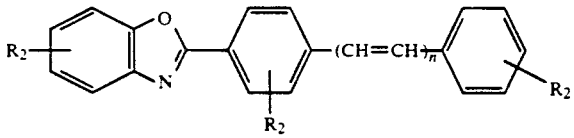

[II-c]

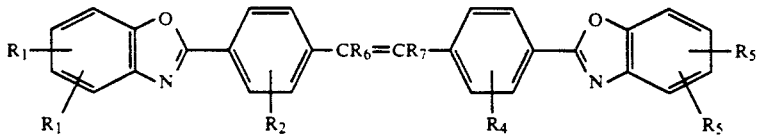

[II-d]

In the above Formulas II-a to II-d, $Y_1$ and $Y_2$ each represent an alkyl group, $Z_1$ and $Z_2$ each represent a hydrogen atom or an alkyl group, n is 1 or 2, $R_1$, $R_2$, $R_4$ and $R_5$ each represent an aryl, alkyl, alkoxy, aryloxy, hydroxyl, amino, cyano, carboxyl, amido, ester, alkylcarbonyl, alkylsulfonyl or dialkylsulfonyl group or a hydrogen atom. $R_6$ and $R_7$ each represent a hydrogen atom, an alkyl group such as a methyl group or an ethyl group, or a cyano group. $R_{16}$ represents a phenyl group, a halogen atom or an alkyl-substituted phenyl group. $R_{15}$ represents an amino group or an organic primary or secondary amino group.

The oil-soluble fluorescent brightening agent used in the light-sensitive material of the present invention specifically includes the following compounds II-1 to II-26.

II-1
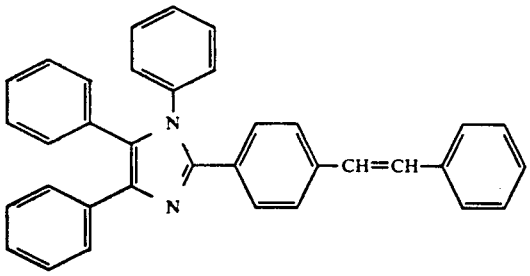
II-2
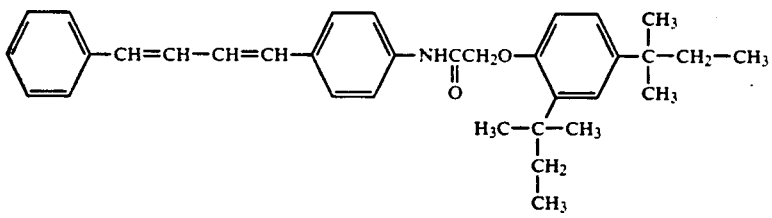
II-3
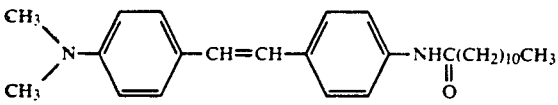
II-4
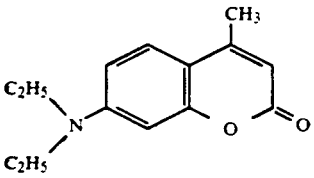
II-5
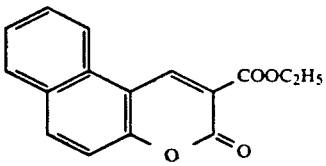
II-6
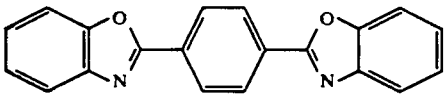
II-7
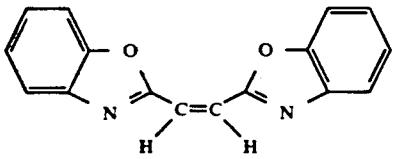
II-8
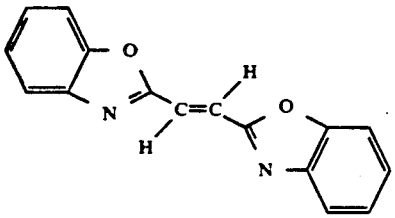

-continued
II-9
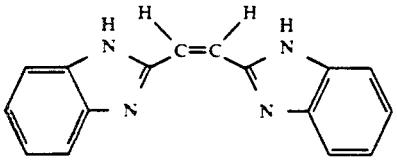
II-10
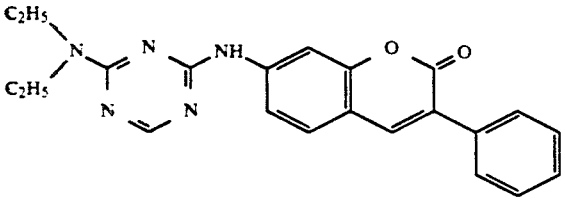
II-11
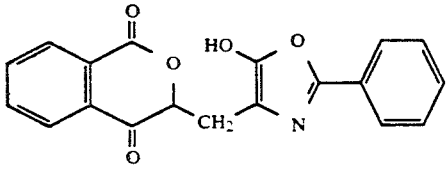
II-12
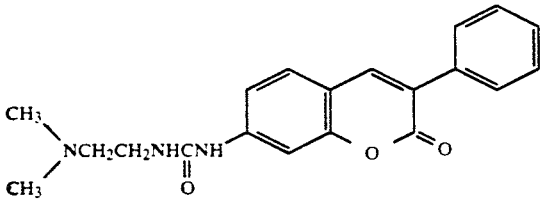
II-13
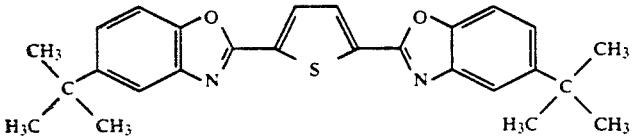
II-14
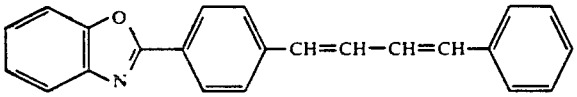
II-15
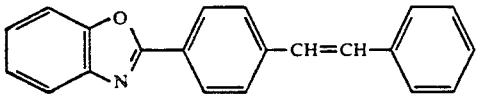
II-16
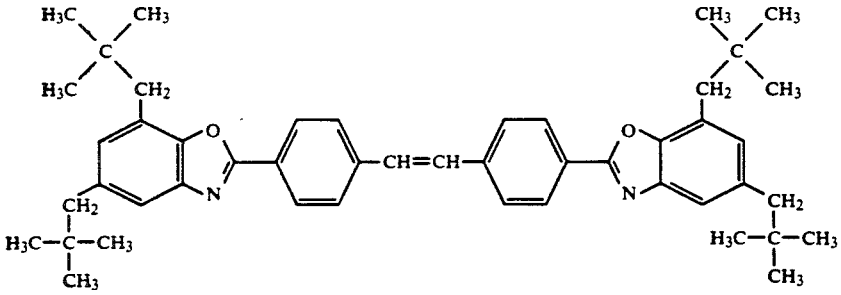
II-17
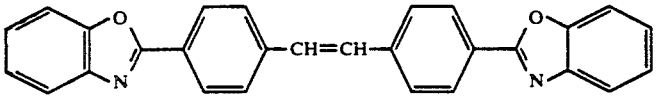

-continued

II-18

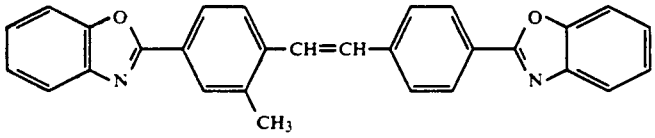

II-19

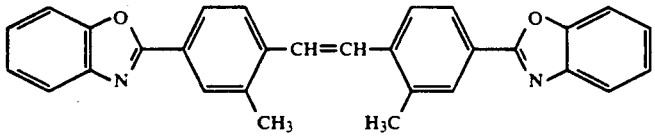

II-20

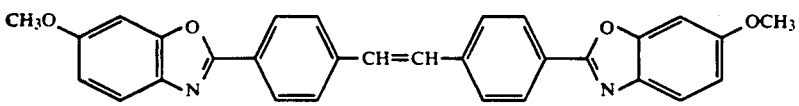

II-21

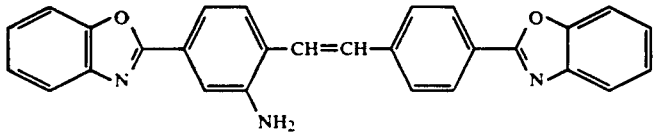

II-22

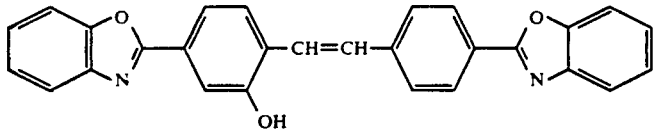

II-23

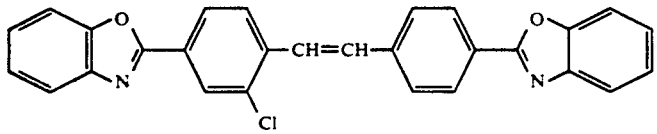

II-24

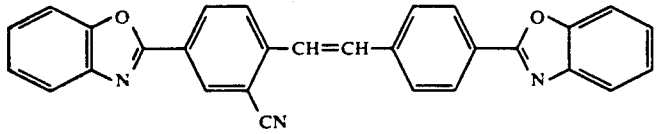

II-25

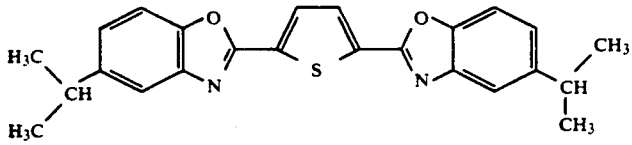

II-26

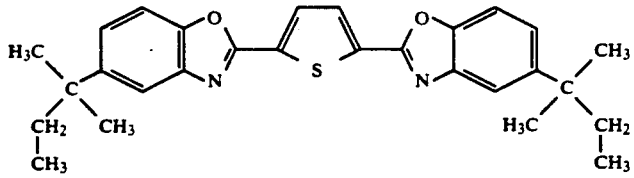

The above exemplary compounds may be used alone or in combination of two or more kinds.

The fluorescent brightening agent may preferably be so added that it is present in a photographic paper in an amount of from 1 to 200 mg/m$^2$, and may most preferably be used in an amount of from 5 to 50 mg/m$^2$.

The layer to which the emulsified dispersion of the fluorescent brightening agent used in the present invention is added may be any layers as long as they are photographic component layers on a support. From the viewpoint of the prevention of so-called blooming, it should be added to a silver halide emulsion layer or a layer as near as possible to the support (a hydrophilic colloid layer such as an intermediate layer).

The above fluorescent brightening agents are known compounds. The exemplary compound II-13, for example, is sold in the market from Ciba-Geigy Corp. under a trade name of Ubitex-OB, and is readily available.

In the silver halide photographic light-sensitive material of the present invention, it is preferred to use a compound of Formula VI shown below.

Formula VI

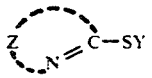

In the formula, Y represents a hydrogen atom, an alkali metal atom, an ammonium group or an organic amine residual group. Z represents a heterocyclic ring of 5 or 6 members, in which the heterocyclic nucleus may preferably be a heterocyclic nucleus selected from nuclei including imidazole. thiazole, oxazole, benzimidazole, benzothiazole, benzoxazole, oxadiazole, thiadiazole, triazole, tetrazole, pyrimidine, triazine, and tetrazaindene.

Typical examples of the compound according to the present invention, represented by the above Formula VI, are shown below.

VI-1

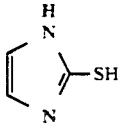

VI-2

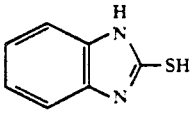

VI-3

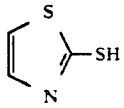

VI-4

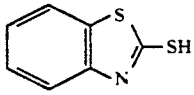

VI-5

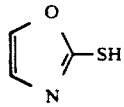

VI-6

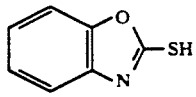

VI-7

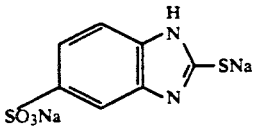

VI-8

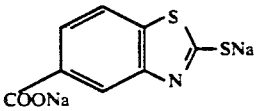

-continued

VI-9

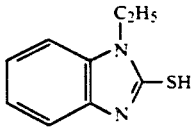

VI-10

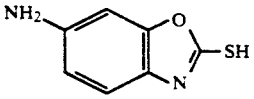

VI-11

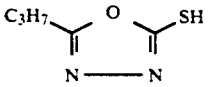

VI-12

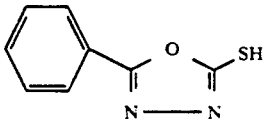

VI-13

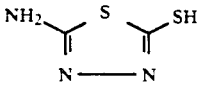

VI-14

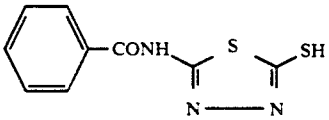

VI-15

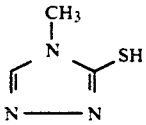

VI-16

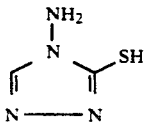

VI-17

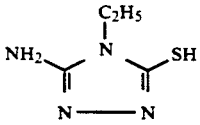

VI-18

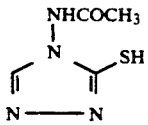

VI-19

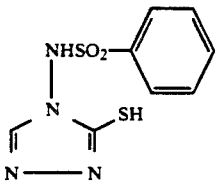

-continued

VI-20

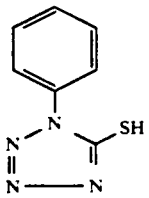

VI-21

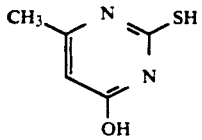

VI-22

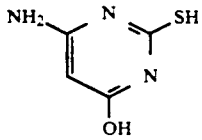

VI-23

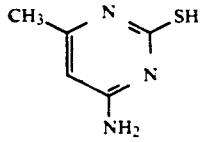

VI-24

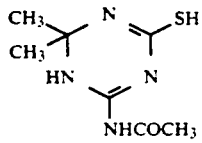

VI-25

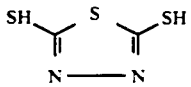

VI-26

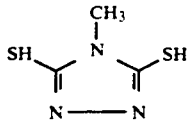

VI-27

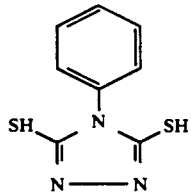

VI-28

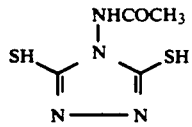

VI-29

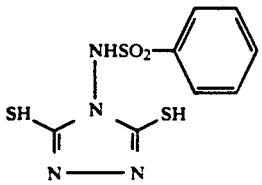

-continued

VI-30

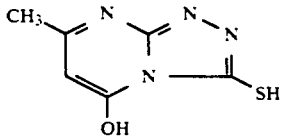

VI-31

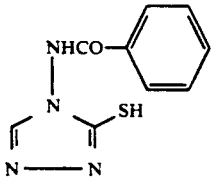

VI-32

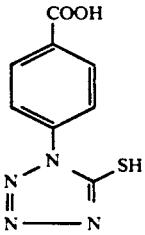

VI-33

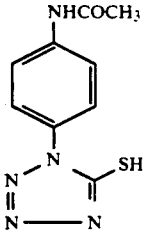

These compounds of the present invention represented Y Formula VI, usable in the present invention, can be readily synthesized by the methods as disclosed in, for example U.S. Pat. Nos. 3,615,501, 2,324,123, 2,384,593, 2,496,940, 3,137,578, 2,496,940, 3,082,088, 3,473,924, 3,575,699, 3,687,660, 2,271,229 and 2,496,940, and British Patents No. 1,141,773 and No. 1,376,600, or by methods corresponding thereto. These compounds can also be readily synthesized by the method disclosed in DAI-YUUKI-KAGAGU (Grand Organic Chemistry), edited by Munio Kotake, Askura Shoten, 1971 Edition, or A. Weissberger, The Chemistry of Heterocyclic Compounds, N.Y. Interscience, the years 1950 to 1964, or methods corresponding thereto.

The amount of the compound represented by the above Formula VI may vary depending on the type of silver halide emulsions and the type of the compounds. In usual instances, the compound may be added in an amount of from 5 mg to 500 mg per mol of silver halide.

In the silver halide emulsion used in the present invention, it is possible to use any of silver bromide, silver iodobromide, silver iodochloride, silver chlorobromide, silver chloroiodobromide and silver chloride, which are used in ordinary silver halide emulsions.

Silver halide grains used in the silver halide emulsions may be obtained by any of an acidic method, a neutral method and an ammoniacal method. The grains may be made to grow at one time, or grow after seed grains have been formed. The manner of preparing the seed grains and the manner of growing them may be the same or different.

The silver halide emulsion may be obtained by simultaneously mixing halide ions and silver ions, or by preparing an aqueous solution in which either one of them is present and then mixing in it the other of them. Alternatively, taking into account the critical growth rate of silver halide crystals, it may be formed by successively simultaneously adding halide ions and silver ions while controlling pH and/or pAg in a mixing vessel. Silver halide grains having regular crystal forms and substantially uniform grain size can thereby be obtained. Halogen composition in a grain may be changed after growth by employing a conversion method.

In preparing the silver halide emulsion, a silver halide solvent can be optionally used for controlling the grain size, grain shape, grain size distribution and grain growth rate of the silver halide grains.

In the course of formation and/or growth of the silver halide grains, metal ions may be added to the grains by the use of at least one of a cadmium salt, a zinc salt, a lead salt, a thallium salt, an iridium salt including a complex salt thereof, a rhodium salt including a complex salt thereof, and an iron salt including a complex salt thereof, to incorporate any of these metal elements into the inner parts of grains and/or the surfaces of the grains, and also reduction sensitizing nuclei can be imparted to the inner parts of the grains and/or the surfaces of the grains by placing the grains in a suitable reducing atmosphere.

The silver halide emulsion may be either the one from which unnecessary soluble salts have been removed after completion of the growth of silver halide grains, or the one from which they remain unremoved. When the salts are removed, they can be removed according to the method disclosed in Research Disclosure No. 17643 (hereinafter "RD"). Paragraph II.

The silver halide grains may have a uniform compositional distribution of silver halide in a grain, or may be comprised of a core/shell grain having different silver halide composition between the inner part and surface layer of a grain.

The silver halide grains may be grains such that a latent image is formed chiefly on the surface, or grains such that a latent image is formed chiefly in the inner part of a grain.

The silver halide grains may be any of those having a regular crystal form such as a cube, an octahedron or a tetradecahedron, or those having an irregular crystal form such as a sphere and a plate. In these grains, those having any ratio of {100} face to {111} face can be used. They may also have a composite form of these crystal forms, or comprise a mix of grains having various crystal forms.

Average grain size (grain size is expressed as a diameter of a circle having an area equal to a projection area) of the silver halide grains may preferably be not more than 2 μm, and particularly preferably not more than 0.7 μm.

The silver halide emulsion used may have any grain size distribution. An emulsion having a broad grain size distribution, which is called a polydisperse emulsion, may be used, or an emulsion having a narrow grain size distribution, which is called a monodisperse emulsion, may also be used alone or by combination of several kinds. The monodisperse emulsion herein referred to is an emulsion having a value of not more than 0.20 obtained when the standard deviation of grain size distribution is divided by an average grain size. The polydisperse emulsion and the monodisperse emulsion may be used in the form of a mixture.

The silver halide emulsion may be used in the form of a mixture of two or more emulsions separately formed.

Various additives can be used in the light-sensitive material of the present invention.

Such additives are described in detail in HD No. 17643 (Dec., 1978) and RD. No. 18716 (Nov., 1976). Corresponding passages thereof are summarized in the following table.

There are not particular limitations on the conditions for exposure and development processing, and reference may be made to, for example, the descriptions at 28 to 30 pages of the above RD 17643.

| Type of additives | RD 17643 | RD 18716 |
|---|---|---|
| 1. Chemical sensitizer | p.23 | p.648, right col. |
| 2. Speed-increasing agent | | " |
| Supersensitizer | | p.649, right col. |
| 3. Brightening agent | p.24 | |
| 4. Antifoggant and stabilizer | pp.24–25 | p.649, right col. |
| 5. Light-absorbent, filter dye, and ultraviolet absorbent | pp.25–26 to p.650, left col. | p.649, right col. |
| 6. Anti-stain agent | p.25, right col. | p.650, left to right col. |
| 7. Hardening agent | p.26 | p.651, left col. |
| Binder | p.26 | " |
| 9. Plasticizer | p.27 | p.650, right col. |
| Wetting agent | | |
| 10. Coating aid | pp.26–27 | " |
| Surfactant | | |
| 11. Antistatic agent | p.27 | " |

For the purpose of improving dimensional stability of the light-sensitive material, a dispersion of a water-insoluble or sparingly water-soluble synthetic polymer (i.e. latex) may be contained in photographic emulsion layers in which the silver halide emulsions of the present invention are used, and other hydrophilic colloid layers.

The support used in the light-sensitive material of the present invention includes, for example, baryta paper; polyethylene-coated paper, polypropylene synthetic paper, glass plates, cellulose acetate films, cellulose nitrate films, polyester films of, e.g., polyethylene terephthalate, polyamide films, polypropylene films, polycarbonate films, and polystyrene films, which can be used depending on the purpose.

In the support for the photographic paper of the present invention, it is possible to add various inorganic white pigments, inorganic color pigments, dispersants, fluorescent brightening agents, antistatic agents, antioxidants, and stabilizers. The surface of the support may be subjected to surface-activation treatment such as corona discharge treatment or flame treatment, and may optionally provided with an under-coat layer.

EXAMPLES

EXAMPLE 1

| | |
|---|---|
| Solution A: | |
| Water | 980 ml |
| Sodium chloride | 2.0 g |
| Gelatin | 20 g |
| Aqueous 0.10% solution of potassium hexachloroiridate | 0.28 ml |
| Aqueous 0.001% solution of potassium hexabromoiridate | 8.5 ml |
| Solution B: | |

-continued

| | |
|---|---|
| Water | 380 ml |
| Sodium chloride | 38 g |
| Potassium bromide | 42 g |
| Solution C: | |
| Water | 380 ml |
| Silver nitrate | 170 g |

To the above Solution A kept at 40° C., the above Solutions B and C were simultaneously added with speed controlled in accordance with growing silver halide grains over a period of 80 minutes while keeping the pH to 3 and the pAg to 7.7. After continuous stirring for 5 minutes, the pH was adjusted to 5.6 with an aqueous sodium carbonate solution, followed by usual desalting and washing. Thereafter, 500 ml of water and 30 g of gelatin were added, followed by dispersion at 50° C. for 30 minutes. An emulsion comprising cubic grains with 35 mol % of silver bromide, 65 mol % of silver chloride and an average grain size of 0.27 μm was thus obtained.

To the emulsion adjusted to pH 5.5 and pAg 7 by adding 10 ml of an aqueous 1% citric acid solution and 10 ml of an aqueous 5% sodium chloride solution, 10 ml of an aqueous 0.1% sodium thiosulfate solution and 7 ml of an aqueous 0.2% chloroauric acid solution were added, and the emulsion was ripened at 57° C. to have a maximum sensitivity.

The emulsion thus obtained was divided, and 25 ml of an aqueous 0.5% solution of 1-phenyl-5-mercaptotetrazole as an antifoggant was added to each portion, and 180 ml of an aqueous 1% solution of 4-hydroxy-6-methyl-1,3,3a,7-tetrazaindene as a stabilizer and gelatin were further added thereto to terminate the ripening.

To each emulsion, an aqueous 0.1% solution of the exemplary sensitizing dye according to the present invention was added in the amount as shown in Table 1, and well adsorbed. Thereafter, 15 ml of an aqueous 10% solution of sodium tri-isopropylnaphthalenesulfonate as a spreading agent, 50 ml of an aqueous 4% solution of a styrene/maleic acid copolymer as a thickening agent, 30 g of a polymer latex of butyl acrylate, 20 ml of an aqueous 20% solution of hydroquinone as a stabilizer and 20 ml of an aqueous 10% solution of potassium bromide were added, followed by stirring.

Next, as shown in Table 1, an emulsified dispersion of the fluorescent brightening agent (as described later) was added so as to give a coating weight of 10 mg/m$^2$.

To each emulsion thus obtained, 50 mg/g gelatin of a hardening agent comprising a 1:0.25 mol reaction product of tetrakis(vinylsulfonylmethyl)methane and taurine potassium salt was added, and the pH was adjusted to 5.6 with citric acid. Emulsion layer coating solutions were thus obtained.

Preparation of anti-halation layer coating solution

To an aqueous 40 g gelatin solution, the following dye (m) was added so as to give a coating weight of 60 mg/m$^2$, and 15 ml of an aqueous 4% solution of a styrene/maleic anhydride copolymer as a thickening agent was further added. A coating solution for an anti-halation layer was thus prepared.

In preparing the coating solution, a fluorescent brightening agent was added to the anti-halation layer coating solution used in the sample as shown in Table 1, in which the fluorescent brightening agent had been contained, in the same manner as in the above emulsion coating solution so as to give a coating weight of 10 m$^2$.

Dye (m)

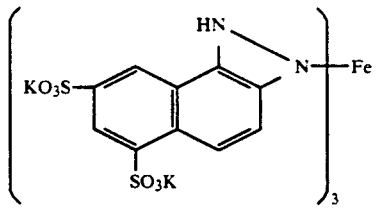

Preparation of protective layer coating solution

Next, to an aqueous gelatin solution, 30 mg/m$^2$ of sodium salt of 2-sulfo-bis(2-ethylhexyl)succinate as a coating aid, 40 mg/m$^2$ of polymethyl methacrylate particles with an average diameter of 4 μm as a matting agent, 30 mg/m$^2$ of the following compound (n) as a fluorine-containing surface active agent, and 10 mg/g gelatin of formalin as a hardening agent were added to prepare a coating solution for a protective layer.

Fluorine-containing surface active agent (n)

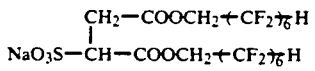

Preparation of samples and evaluation thereon

The anti-halation layer coating solution, emulsion layer coating solution, and protective layer coating solution prepared in this way were simultaneously coated in three layers on a 110 μm thick polyethylene-coated paper having a hydrophilic colloid backing layer and an under-coat layer and containing 15 wt. % of $TiO_2$. In order to examine coating solution stability of the emulsion layer coating solution, samples were prepared for both instances in which emulsion layer coating solutions were left to stand for 1 hour and 10 hours after their preparation. The resulting samples had a coating weight of silver of 1.4 g/m$^2$, and a coating weight of gelatin of 1.4 g/m$^2$ for the anti-halation layer, 1.4 g/m$^2$ for the emulsion layer and 0.9 g/m$^2$ for the protective layer.

Samples thus obtained were each subjected to flash exposure for $10^{-5}$ second using a xenon flash lamp through an optical wedge and Kodak Wratten Filter No. 88A, and then processed using Konica Automatic Processor GR-14 (manufactured by Konica Corporation) by the use of the developing solution and fixing solution as described below. Evaluation was made on the items shown in Table 1. The processing was carried out under conditions of 30° C., 20 seconds, for developing; about 38° C., 20 seconds, for fixing; room temperature, 20 seconds, for washing; and about 40° C. for drying.

Results obtained are shown in Table 1. Sensitivity is expressed as a reciprocal of the amount of exposure necessary for giving a density of 1.0,and a relative value assuming that of Sample No. 1 as 100.

The whiteness shown in Table 1 expresses the whiteness of a sample having been processed, and is visually evaluated according to a five-rank system. The best is evaluated as 5, and the poorest as 1.

Preparation of emulsified dispersion of oil-soluble fluorescent brightening agent In a mixed solvent of 200 ml of cresyldiphenyl phosphate and 100 ml of n-butanol, 5.0 g of an oil-soluble fluorescent brightening agent was dissolved. The resulting solvent was mixed in its total amount with 1,500 ml of an aqueous 12% gelatin solution containing 3 g of sodium tripropylnaphthalenesulfonate, and thereafter a butyl acrylate polymer latex was added in an amount of 200 g as a solid. An emulsified dispersion of an oil-soluble fluorescent brightening agent was thus prepared.

| Formulation of developing solution: | |
|---|---|
| Pure water (ion-exchanged water) | about 800 ml |
| Potassium sulfite | 60 g |
| Disodium ethylenediaminetetraacetate | 2 g |
| Potassium hydroxide | 10.5 g |
| 5-Methylbenzotriazole | 300 mg |
| Diethylene glycol | 25 g |
| 1-Phenyl-4,4-dimethyl-3-pyrazolidinone | 300 mg |
| 1-Phenyl-5-mercaptotetrazole | 60 mg |
| Potassium bromide | 3.5 g |
| Hydroquinone | 20 g |
| Potassium carbonate | 15 g |

Made up to 1,000 ml by adding pure water (ion-exchange water). The pH value of the developing solution was about 10.8.

| Formulation of fixing solution: | |
|---|---|
| (Composition A) | |
| Ammonium thiosulfate (an aqueous 72.5% w/w solution) | 240 ml |
| Sodium sulfite | 17 g |
| Sodium acetate trihydrate | 6.5 g |
| Boric acid | 6 g |
| Sodium citrate dihydrate | 2 g |
| Acetic acid (an aqueous 90% w/w solution) | 13.6 ml |
| (Composition B) | |
| Pure water (ion-exchanged water) | 17 ml |
| Acetic acid (an aqueous 50% w/w solution) | 4.7 g |
| Aluminum sulfate (a aqueous solution with a content of 8.1% w/w in terms of $Al_2O_3$) | 26.5 g |

When the fixing solution was used, the above compositions were dissolved in 500 ml of water in the order of Composition A and Composition B so as to be made up to 1 l. The pH of the resulting fixing solution was about 4.3.

TABLE 1

| Sample No. | Sensitizing dye No. | Sensitizing dye (mg/mol AgX) | Formula I, II, III No. | Formula I, II, III (mg/mol AgX) | Fluorescent brightening agent No. | Coated after 1 hour* Sensitivity | Coated after 1 hour* Whiteness | Coated after 10 hours Sensitivity | Coated after 10 hours Whiteness | *Sample left at 50° C., 50% RH for 3 days Sensitivity | *Sample left at 50° C., 50% RH for 3 days Whiteness | Remarks |
|---|---|---|---|---|---|---|---|---|---|---|---|---|
| 1-1 | I-4 | 40 | — | — | — | 100 | 3 | 82 | 3 | 59 | 2 | X |
| 1-2 | I-16 | 50 | — | — | — | 95 | 3 | 80 | 3 | 53 | 2 | X |
| 1-3 | I-4 | 40 | — | — | II-13 | 80 | 5 | 40 | 5 | 38 | 5 | X |
| 1-4 | I-16 | 50 | — | — | " | 82 | 5 | 45 | 5 | 41 | 5 | X |
| 1-5 | I-4 | 40 | — | — | II-4 | 75 | 5 | 35 | 4 | 40 | 4 | X |
| 1-6 | I-4 | 40 | — | — | II-8 | 82 | 5 | 38 | 4 | 42 | 4 | X |
| 1-7 | I-4 | 40 | — | — | II-19 | 88 | 4 | 42 | 4 | 39 | 4 | X |
| 1-8 | I-4 | 40 | — | — | II-25 | 72 | 4 | 36 | 3 | 35 | 3 | X |
| 1-9 | I-4 | 40 | I-1 | 300 | — | 135 | 3 | 135 | 3 | 130 | 3 | Y |
| 1-10 | I-16 | 50 | I-1 | 300 | — | 120 | 3 | 120 | 3 | 125 | 3 | Y |
| 1-11 | I-4 | 40 | I-3 | 200 | — | 125 | 3 | 125 | 3 | 122 | 3 | Y |
| 1-12 | I-4 | 40 | I-7 | 150 | — | 122 | 3 | 123 | 3 | 118 | 3 | Y |
| 1-13 | I-4 | 40 | I-18 | 200 | — | 130 | 3 | 130 | 3 | 129 | 3 | Y |
| 1-14 | I-4 | 40 | II-3 | 270 | — | 115 | 3 | 114 | 3 | 110 | 3 | Y |
| 1-15 | I-4 | 40 | III-2 | 200 | — | 110 | 3 | 112 | 3 | 115 | 3 | Y |
| 1-16 | I-4 | 40 | I-3 | 200 | II-4 | 125 | 5 | 121 | 5 | 120 | 5 | Y |
| 1-17 | I-4 | 40 | I-3 | 200 | II-13 | 120 | 5 | 114 | 5 | 109 | 5 | Y |
| 1-18 | I-4 | 40 | I-3 | 200 | II-19 | 132 | 5 | 130 | 5 | 121 | 5 | Y |
| 1-19 | I-4 | 40 | I-3 | 200 | II-25 | 113 | 5 | 103 | 5 | 110 | 5 | Y |
| 1-20 | I-4 | 40 | II-3 | 270 | II-4 | 120 | 5 | 118 | 5 | 110 | 5 | Y |
| 1-21 | I-3<br>I-4 | 20<br>20 | — | — | — | 110 | 3 | 90 | 3 | 70 | 2 | X |
| 1-22 | " | " | — | — | II-13 | 90 | 5 | 40 | 5 | 35 | 5 | X |
| 1-23 | " | " | I-3 | 200 | — | 130 | 3 | 130 | 3 | 125 | 5 | Y |
| 1-24 | " | " | I-3 | 200 | II-13 | 130 | 5 | 128 | 5 | 122 | 5 | Y |

X: Comparative Example, Y: Present Invention

As will be evident from Table 1, the samples according to the present invention have caused no deterioration of sensitivity even after standing of the emulsion layer coating solutions for a long period of time, and also showed a stable storage stability as a light-sensitive material.

No deterioration of photographic performance was also seen even when the fluorescent brightening agent was incorporated in the samples according to the present invention.

EXAMPLE 2

Preparation of emulsion layer coating solution

| | |
|---|---|
| Solution A: | |
| Water | 9.7 l |
| Sodium chloride | 20 g |
| Gelatin | 105 g |
| Solution B: | |
| Water | 3.8 l |
| Sodium chloride | 365 g |
| Gelatin | 94 g |
| Potassium bromide | 450 g |
| Aqueous 0.10% solution of potassium hexachloroiridate | 28 ml |
| Aqueous 0.01% solution of potassium hexabromoiridate | 1.0 ml |
| Solution C: | |
| Water | 3.8 l |
| Silver nitrate | 1,700 g |

To the above Solution A kept at 40° C., the above Solutions B and C were simultaneously added over a period of 60 minutes while keeping the pH to 3.0 and the pAg to 7.7. The rate of addition of the solutions was controlled corresponding to the growing of the silver halide grains. After continuous stirring for 10 minutes, the pH was adjusted to 6.0 with an aqueous sodium carbonate solution, to which 2 l of an aqueous 20% magnesium sulfate solution and 2.55 l of an aqueous 5% polynaphthalenesulfonic acid solution were added. The emulsion was flocculated at 40° C., followed by decantation and washing to remove excess salts from the emulsion. Next, 3.7 l of water was added to the resulting emulsion to carry out dispersion, to which 0.9 l of an aqueous 20% magnesium sulfate solution was again added, and excess salts were removed from the emulsion in the same manner. To the resulting emulsion, 3.7 l of water and 141 g of gelatin were added to carry out dispersion at 55° C. for 30 minutes. An emulsion comprising grains with 35 mol % of silver bromide, 65 mol % of silver chloride, an average grain size of 0.25 μm and a degree of monodispersion of 9% was thus obtained. Next, 120 ml of an aqueous 1 % citric acid solution and 220 ml of an aqueous 5% sodium chloride solution were added. Thereafter, 80 ml of an aqueous 1% sodium thiosulfate solution and further 70 ml of an aqueous 0.2% chloroauric acid solution were added, and the emulsion was ripened at 55° C. for 80 minutes.

To the above emulsion, 15 g of 4-hydroxy-6-methyl-1,3.3a,7-tetrazaindene as a stabilizer and 1,600 ml of an aqueous 20% gelatin solution were added to terminate the ripening.

Subsequently, the compounds represented by Formulas I, II and III were each added in the amount as shown in Table 2, and the red-sensitive sensitizing dyes I-8, I-19, I-4, I-3 and I-16 according to the present invention and the phenol resins V-1 and V-17 were each further used in combination in the amount as shown in Table 2.

Thereafter, after adjustment of the pH and pAg, 30 g of hydroquinone as an antifoggant and 10 g of sodium p-dodecylbenzenesulfonate as a spreading agent were further added. Subsequently, 20 g of a styrene/maleic anhydride copolymer as a thickening agent and 120 g of a polymer latex of ethyl acrylate were added, and 1-hydroxy-3,5-dichloro-s-triazine sodium salt and formalin were added as hardening agents immediately before coating. The above emulsion was coated on a polyethylene terephthalate support having a backing layer and also having been subbed, so as to give a silver weight of 3.5 g/m$^2$. As a protective layer coating solution, 15 g of the following compound (a) as a spreading agent was added in an aqueous solution containing 500 g of gelatin and 20 g of amorphous silica with an average particle diameter of 3.5μ was further added, which were then dispersed. These were simultaneously coated to provide an emulsion layer and a protective layer so as to give a gelatin weight of 1.1 g/m$^2$ $$\begin{array}{l} CH_2COO(CH_2)_9CH_3 \\ | \\ CHCOO(CH_2)_2CH(CH_3)_2 \\ | \\ SO_3Na \end{array} \qquad (a)$$

In order to evaluate the storage stability of the emulsion layer coating solution, an emulsion layer coating solution to which no hardening agent had been added was stored for 12 hours with stirring at 40° C., and changes in sensitivity and gamma with respect to a coating solution similarly stored for 1 hour was examined.

Samples thus obtained were each exposed to light for $10^{-5}$ second using a xenon light source through an optical wedge and Kodak Wratten Filter No. 88A. Thereafter, the samples were processed under the same conditions as in Example 1.

Transmission density of the samples having been processed was measured using a digital densitometer PDA-65 Type (manufactured by Konica Corporation), and photographic performance was evaluated based on the characteristic curve.

First, the photographic sensitivity was determined from a reciprocal of the amount of exposure necessary for giving a density of 2.5, and is expressed as a relative value assuming that of Sample No. 2-1 as 100. The gamma is expressed as a gradient at the straight-line portion of the characteristic curve. Results obtained are shown in Table 2.

As will be evident from Tables 1 and 2, the present invention has achieved a high sensitivity, a high gamma, and has caused only very small deterioration of performance in the storage stability test.

TABLE 2

| Sample No. | Sensitizing dye Type | Sensitizing dye Amount (mg/mol AgX) | Sensitizing dye Spectral sensitivity, maximum (nm) | Compound of Formula I, II, III Type | Compound of Formula I, II, III Amount (mg/mol AgX) | Phenol resin Type | Phenol resin Amount (mg/mol AgX) | (1) | (2) (%) | (3) | (4) | Remarks |
|---|---|---|---|---|---|---|---|---|---|---|---|---|
| 2-1 | I-8 | 60 | 780 | — | — | — | — | 100 | +25 | 5.7 | 5.0 | X |
| 2-1 | " | " | " | I-1 | 400 | — | — | 92 | +8 | 6.9 | 6.0 | Y |
| 2-3 | " | " | " | " | " | V-1 | 20 | 132 | −4 | 7.7 | 7.5 | " |
| 2-4 | " | " | " | " | " | V-17 | 20 | 124 | −4 | 7.3 | 7.1 | " |
| 2-5 | " | " | " | I-3 | 400 | " | " | 119 | −3 | 7.6 | 7.5 | " |
| 2-6 | " | " | " | I-9 | 400 | " | " | 122 | −4 | 7.6 | 7.5 | " |
| 2-7 | " | " | " | II-1 | 400 | " | " | 110 | −5 | 7.8 | 7.7 | " |
| 2-8 | " | " | " | III-2 | 400 | " | " | 115 | −5 | 7.9 | 7.7 | " |
| 2-9 | " | " | " | — | — | " | " | 125 | −25 | 6.5 | 5.4 | X |
| 2-10 | I-19 | 60 | 785 | — | — | — | — | 108 | +18 | 6.1 | 6.1 | " |
| 2-11 | " | " | " | I-3 | 400 | — | — | 90 | +7 | 6.7 | 6.2 | Y |
| 2-12 | " | " | " | — | — | V-1 | 20 | 120 | −16 | 7.3 | 5.9 | X |
| 2-13 | " | " | " | I-3 | 400 | " | " | 128 | +3 | 7.8 | 7.7 | Y |
| 2-14 | I-4 | 50 | 780 | " | " | " | " | 120 | −5 | 7.9 | 7.7 | " |
| 2-15 | I-16 | 50 | 800 | II-1 | 400 | " | " | 125 | −3 | 7.8 | 7.7 | " |
| 2-16 | I-3/ | 20/20 | 786 | " | " | " | " | 135 | −6 | 7.8 | 7.7 | " |

TABLE 2-continued

| Sample No | Sensitizing dye Type | Sensitizing dye Amount (mg/mol AgX) | Sensitizing dye Spectral sensitivity, maximum (nm) | Compound of Formula I, II, III Type | Compound of Formula I, II, III Amount (mg/mol AgX) | Phenol resin Type | Phenol resin Amount (mg/mol AgX) | (1) | (2) (%) | (3) | (4) | Remarks |
|---|---|---|---|---|---|---|---|---|---|---|---|---|
| | I-4 | | | | | | | | | | | |

X: Comparative Example, Y: Present Invention
(1) Sensitivity before storage of coating solution
(2) Rate of change in sensitivity after storage of coating solution
(3) Gamma before storage of coating solution
(4) Gamma after storage of coating solution

What is claimed is:

1. A silver halide photographic light-sensitive material comprising a support having thereon (i) a silver halide emulsion layer being spectrally sensitized with at least one selected from a cationic di-carbocyanine and a cationic tri-carbocyanine sensitizing dye; and a phenol resin formed by condensation of a phenol and an aldehyde; and (ii) a compound contained in at least one of said silver halide emulsion layer and an hydrophilic colloid layer other than said silver halide emulsion layer, which is provided on the side of said support on which said silver halide emulsion layer is provided, said phenol resin having a polymerization degree in the range of 2 to 10,000 and being present in amount of $1\times10^{-4}$ to 100 g per mole of silver halide contained in said silver halide emulsion, and being selected from the group consisting of:

Exemplary Phenol Resins:

V-1

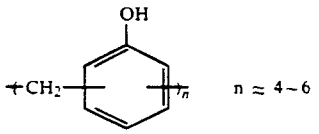

V-2

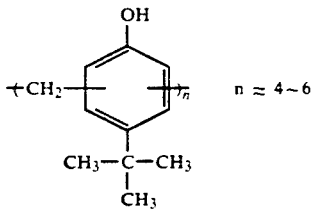

V-3

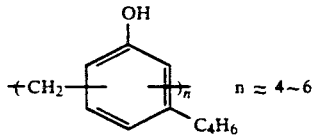

V-4

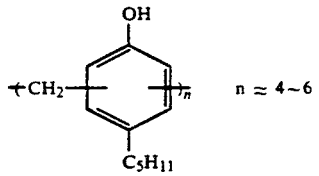

V-5

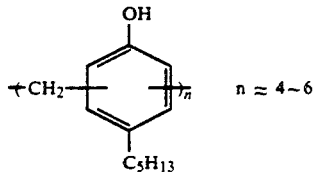

-continued

Exemplary Phenol Resins:

V-6

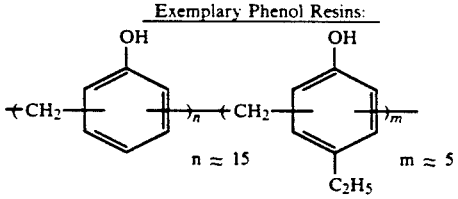

V-7

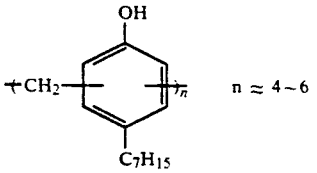

V-8

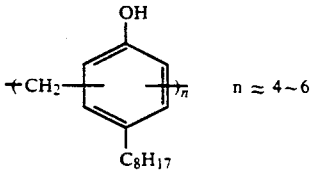

V-9

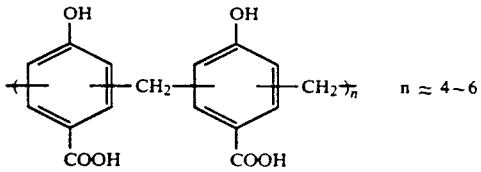

V-10

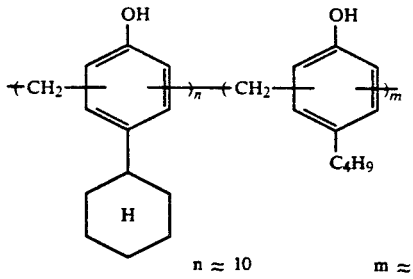

V-11

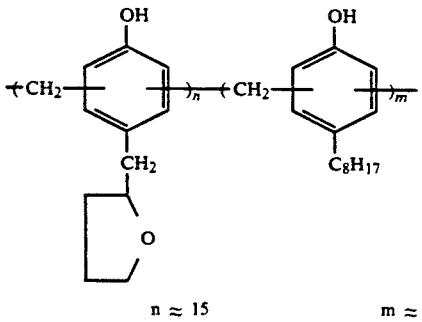

-continued

Exemplary Phenol Resins:

V-12

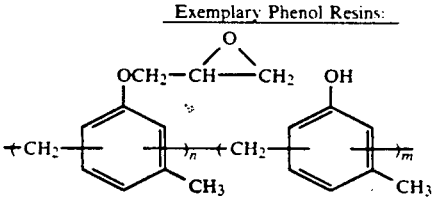

n ≈ 5 m ≈ 15

V-13

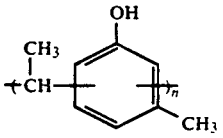

n ≈ 4~6

V-14

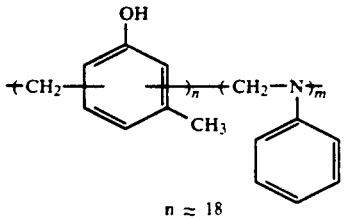

n ≈ 18 m ≈ 2

V-15

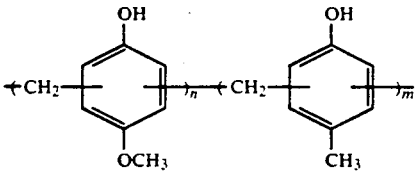

n ≈ 5 m ≈ 20

V-16

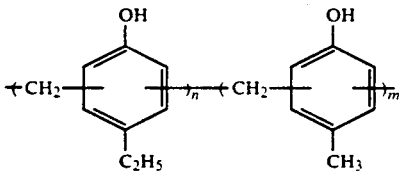

n ≈ 2 m ≈ 3

V-17

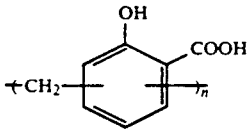

n ≈ 4~6 and said compound contained in at least one of said silver halide emulsion layers and a hydrophilic colloid layer other than said silver halide emulsion layer being present in an amount of 5 mg to 5 g per mole of silver halide contained in the silver halide emulsion layer and being selected from the group consisting of:

(I-1)

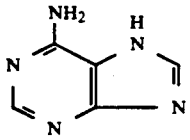

(I-2)

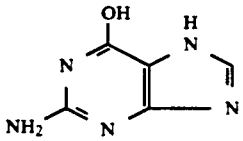

-continued (I-3)

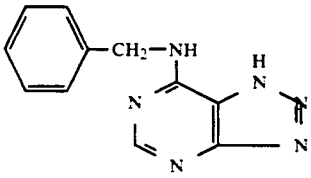

(I-4)

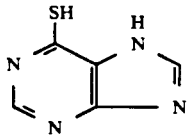

(I-5)

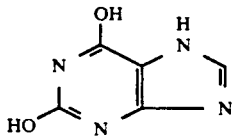

(I-6)

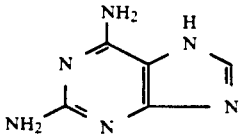

(I-7)

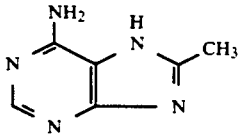

(I-8)

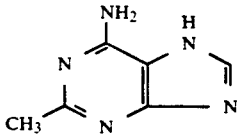

(I-9)

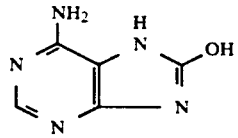

(I-10)

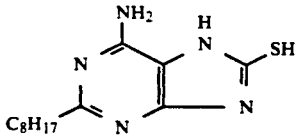

(I-11)

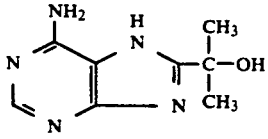

(I-12)

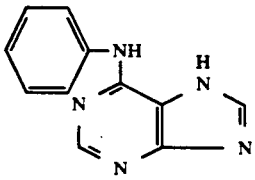

-continued (I-13)

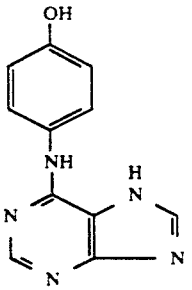

(I-14)

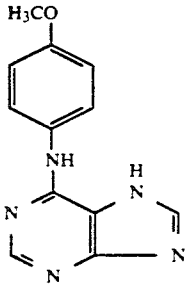

(I-15)

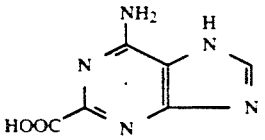

-continued (I-16)

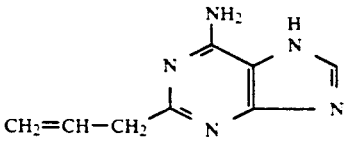

(I-17)

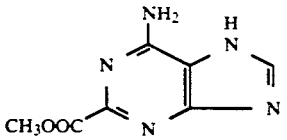

(I-18)

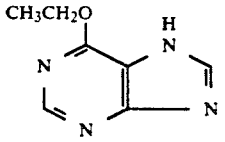

(I-19)

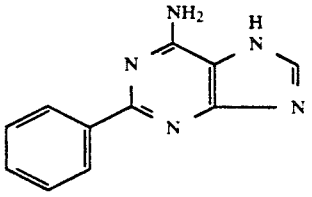

(II-1) 6-Amino-purine ribocide
(II-2) 6-Chloro-purine ribocide
(II-3) 6-Methylamino-purine ribocide
(II-4) 5'-Phosphoric acid-6-amino-purine ribocide
(II-5) 5'-Phosphoric acid-6-chloro-purine ribocide
(II-6) 5'-Phosphoric acid-6-amino-purine ribocide
(II-7) 5'-Hydroxymethyl-6-methylamino-purine ribocide
(II-8) 5'-Methyl-6-amino-purine ribocide
(III-1) 6-Oxy-purine ribocide
(III-2) 2-Amino-6-oxy-purine ribocide
(III-3) 5'-Phosphoric acid-6-oxy-purine ribocide.

* * * * *